United States Patent
Yoskowitz (10) Patent No.: US 10,655,766 B2
(45) Date of Patent: May 19, 2020

(54) FLANGE AND METHOD OF ATTACHING FLANGE PORTIONS TO DUCT MEMBERS

(71) Applicant: Capital Hardware Supply, Inc., Closter, NJ (US)

(72) Inventor: David Yoskowitz, Bloomsbury, NJ (US)

( * ) Notice: Subject to any disclaimer, the term of this patent is extended or adjusted under 35 U.S.C. 154(b) by 298 days.

(21) Appl. No.: 15/461,714

(22) Filed: Mar. 17, 2017

(65) Prior Publication Data

US 2017/0276273 A1    Sep. 28, 2017

Related U.S. Application Data

(60) Provisional application No. 62/314,198, filed on Mar. 28, 2016.

(51) Int. Cl.
*F16L 23/14* (2006.01)
*F16B 25/00* (2006.01)
*F16B 5/02* (2006.01)

(52) U.S. Cl.
CPC .......... *F16L 23/14* (2013.01); *F16B 5/02* (2013.01); *F16B 25/0021* (2013.01); *F16L 2201/60* (2013.01)

(58) Field of Classification Search
CPC ........ F16L 23/12; F16L 23/14; F16L 2201/60
USPC ........................... 285/93, 405, 406, 407, 412
See application file for complete search history.

(56) References Cited

U.S. PATENT DOCUMENTS

| | | | |
|---|---|---|---|
| 2,449,265 A * | 9/1948 | Williams | F01P 11/04 138/104 |
| 3,731,390 A * | 5/1973 | Sloan | B23B 49/00 33/644 |
| 4,288,115 A | 9/1981 | Sullivan | |
| 4,416,309 A * | 11/1983 | Salim | F16L 1/11 138/104 |
| 4,564,227 A | 1/1986 | Murck | |
| 4,725,083 A | 2/1988 | Schauer | |
| 4,930,225 A * | 6/1990 | Phillips | B25H 7/00 33/526 |
| 5,103,872 A | 4/1992 | Jyh-Long | |
| 5,621,956 A | 4/1997 | Kolesar | |
| 6,561,553 B1 * | 5/2003 | Issagholian-Havai | F16L 23/14 285/405 |
| 6,839,977 B1 * | 1/2005 | Truckner | E04F 21/26 33/476 |

(Continued)

*Primary Examiner* — Aaron M Dunwoody
(74) *Attorney, Agent, or Firm* — Abelman, Frayne & Schwab; Stefan Knirr (57) ABSTRACT

A flange to be assembled to an end portion of a duct member includes a plurality of pre-fabricated fastener entry areas disposed in an inner wall member, and a plurality of first fastener indicators disposed on an outer wall member, wherein the pre-fabricated fastener entry areas are substantially aligned with the first fastener indicators, each of the plurality of first fastener indicators being sized to guide and each corresponding fastener entry areas being sized to receive a self-tapping screw fastener there through to fasten the wall members to the end portion of the duct member. The fastener entry areas and correspondingly aligned fastener indicators, respectively, may be spaced apart such that the fasteners can be inserted at regular intervals along the length of the flange and the length of the end of the duct member.

21 Claims, 9 Drawing Sheets

(56) References Cited

U.S. PATENT DOCUMENTS

| | | | | |
|---|---|---|---|---|
| 7,228,638 | B2* | 6/2007 | Goodwin | A01K 29/00 33/511 |
| 8,307,564 | B1* | 11/2012 | Heaton | G01B 3/566 33/429 |
| 9,212,770 | B2 | 12/2015 | Richard et al. | |
| 9,523,451 | B1* | 12/2016 | Nichols | B05D 5/10 |
| 10,151,415 | B1* | 12/2018 | Holm | E03C 1/00 |
| 2003/0110914 | A1* | 6/2003 | Brazell | B23D 45/044 83/471.3 |
| 2008/0105321 | A1* | 5/2008 | Campau | E03C 1/021 138/104 |
| 2009/0022569 | A1* | 1/2009 | Richard | F16L 23/14 411/508 |
| 2009/0308476 | A1* | 12/2009 | DeMartino | F16L 9/12 138/104 |
| 2011/0104418 | A1* | 5/2011 | Fish | G01B 3/004 428/36.9 |

* cited by examiner

FLANGE AND METHOD OF ATTACHING FLANGE PORTIONS TO DUCT MEMBERS

CROSS REFERENCE TO RELATED APPLICATION

This application claims priority to U.S. provisional application No. 62/314,198, filed on Mar. 28, 2016, the content of which is incorporated by reference in its entirety.

BACKGROUND OF THE INVENTION

1. Field of the Invention

This invention relates to ventilation ducts, and in particular, to flange portions suitable for interconnecting adjacent duct members.

2. Description of the Related Art

Ducts and duct work are formed by securely interconnecting duct members and other components such as flanges using fasteners. Various arrangements have been suggested to facilitate the joining. Example devices and methods for such interconnections are shown in U.S. Pat. Nos. 4,288,115; 4,564,227; 4,725,083, 5,103,872; 5,621,956; and 9,212,770. In general, they do not most advantageously address issues inherent with material handling, part manipulation, and the ease of assembly, particularly given the often difficult orientation of assembler to workpiece encountered in the installation of a ductwork system.

U.S. Pat. No. 4,288,115 to Sullivan describes a duct jointing system with hollow flange members on the ends of ducts, and having a snap-on cleat for fastening abutting flange members together. A corner portion is shown to have holes in legs, but such holes do not receive fasteners.

U.S. Pat. No. 4,564,227 to Murck provides a flanged duct joint with snap-in corner pieces having legs which fit into two abutting flanges to assemble the flanges in a joined configuration.

U.S. Pat. No. 4,725,083 to Schauer discloses a flanged joint having walls on flanges shaped for receiving corner pieces. The abutting flanges are joined together by bolting complementary bores in the corner pieces. Depressions in the flange walls are oriented to receive complementary projections from the corner pieces in a friction fit, but the depressions are not and cannot be used to fasten complementary flanges together, since walls of the flanges are interposed between the depressions of the abutting flange walls.

U.S. Pat. No. 5,103,872 to Jyh-Long discloses a flanged joint with abutting flanges retained together by flange clamps and by bolts fastening corner pieces together. The flange strip elements have projections for engaging raised projections on the end portions of the ducts, but not the abutting flange.

U.S. Pat. No. 5,621,956 to Kolesar has flange members with screws inserted for attaching the flange members to the ends of ducts. Bolts pass through bolt holes in the corner pieces attached to the flanges for fastening abutting corner pieces, and thus assembling the flanges and duct sections.

As noted, these prior art teachings present complicated arrangements for securing flanges to the ends of ducts and/or for interconnecting duct members, and such arrangements typically require additional components which make the interconnections more expensive to implement.

Another prior art method for interconnecting duct members, which is being commercially practiced, is shown in FIGS. 1-6, in which multiple layers of sheet metal are placed in juxtaposition, and apertures are created through which joining members are secured. As illustrated, a flange 10 is placed adjacent to an end portion 12 of a duct member. The flange 10 includes a pair of wall members 14, 16 joined by an intermediate member 18, with the wall members 14, 16 placed on the duct member such that each wall member 14, 16 is adjacent to opposite sides of the end portion 12.

Figure 2:
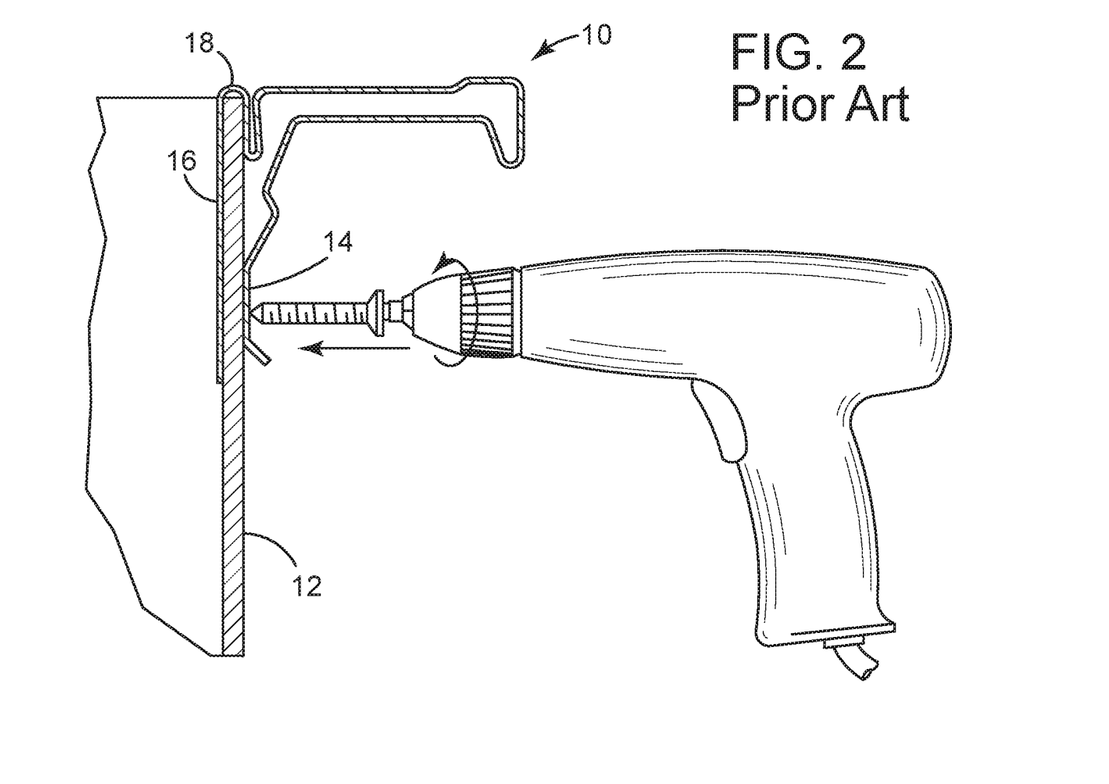
FIG. 2 is a left side cross-sectional view of the flange and end portion of FIG. 1, prior to assembly.
Figure 3:
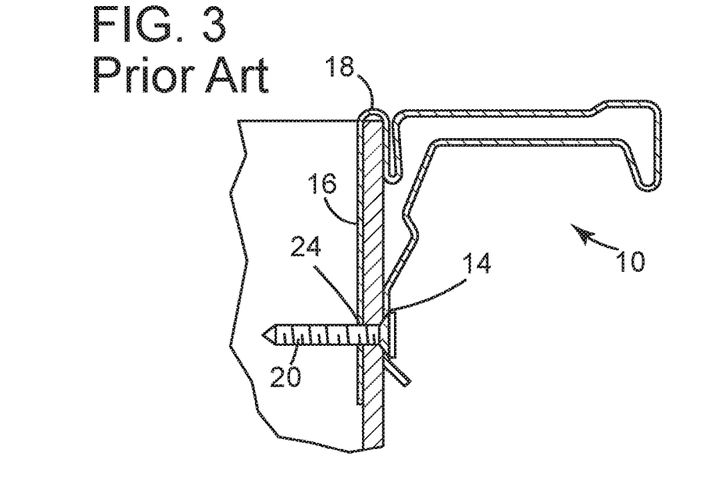
FIG. 3 is a left side cross-sectional view of the assembled flange and end portion of FIG. 1.

To secure the flange 10 to the duct member, a fastener 20 is placed adjacent to one of the wall members 14, 16, preferably the wall member adjacent to the exterior surface of the duct member, such as the wall member 14 shown in FIG. 2. A tool 22, such as a drill, or alternatively a repeater tool or gun, is used to provide pressure and optionally a drilling force to the fastener 20 in the direction of the arrow shown in FIG. 2, in order to create apertures 24 in both the flange 10 and the end portion 12 of the duct member, as shown in FIG. 3. In one embodiment, the fastener 20 may be a screw for serving both as a tool workpiece to create the apertures 24 and to function as the inserted fastener 20 after insertion by the tool 22.

Figure 4:
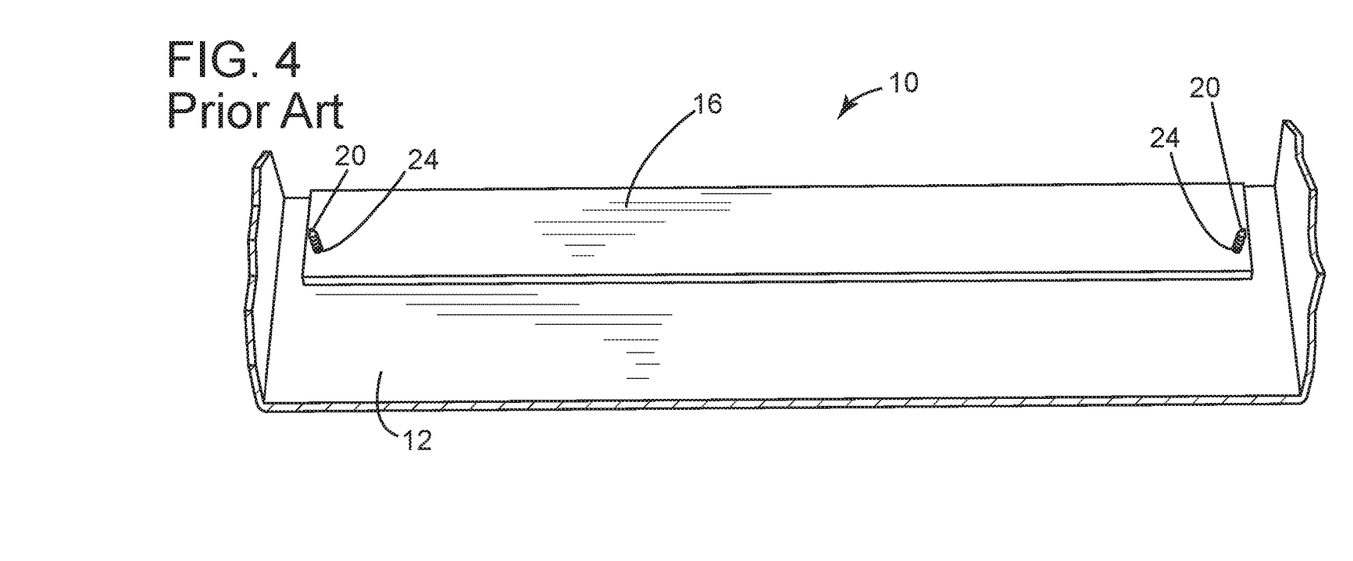
FIG. 4 is a bottom top rear perspective view of the assembled flange and end portion of FIG. 1.

In the fastened configuration of FIGS. 3-4, the fastener 20 passes through the apertures 24 to secure the flange to the duct member in the assembled configuration, allowing the flange 10 to join other flanges or components, such that the duct member connected to the flange 10 is positioned and assembled to other duct members, as required.

Although extensively used, this prior art insertion method has numerous disadvantages. For example, by requiring the fastener 20 to pass through multiple solid layers of material, (i.e., the wall members 14, 16 as well as the end portion 12, where layer each is formed of sheet metal), the assembler using the tool 22 must apply significant pressure to the fastener 20 to pierce the three layers of metallic material. In addition, if the tool 22 is a drill or other device for applying a rotational force as well as a longitudinal insertion force in the direction of the arrow in FIG. 4, the assembler will experience significantly higher counter-torque as the fastener 20 passes through multiple layers 12-16 of material. These higher pressures and torques reduce the efficiency of insertion of the fastener 20 to join the flange 10 to the duct member, and may also cause injury to the assembler.

Furthermore, as the fastener 20 passes through the flange 10 and the end portion 12, debris at the insertion point from the formed apertures will be positioned between the flange 10 and the end portion 12. Thus, the assembled flange 10 and the end portion 12 often do not have a very tight fit in the final assembly.

Figure 5:
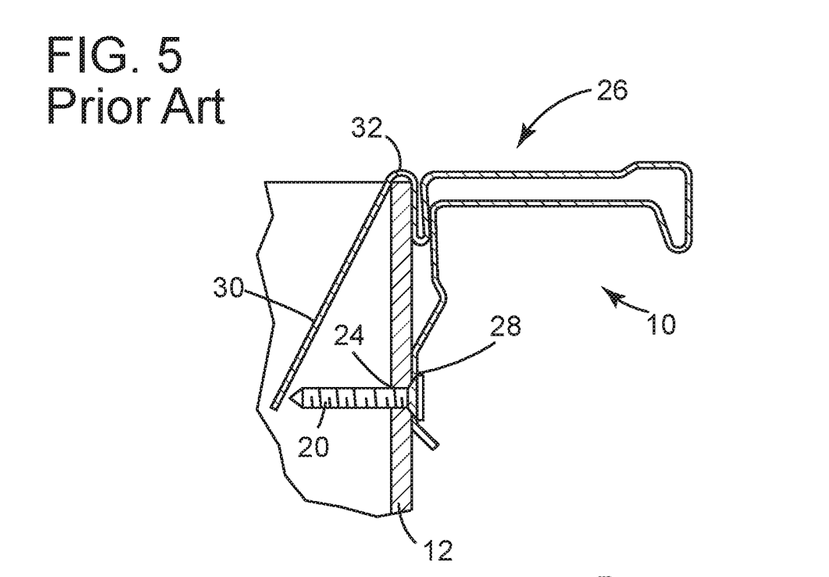
FIG. 5 is a left side cross-sectional view of an improperly assembled flange and end portion of FIG. 1.
Figure 6:
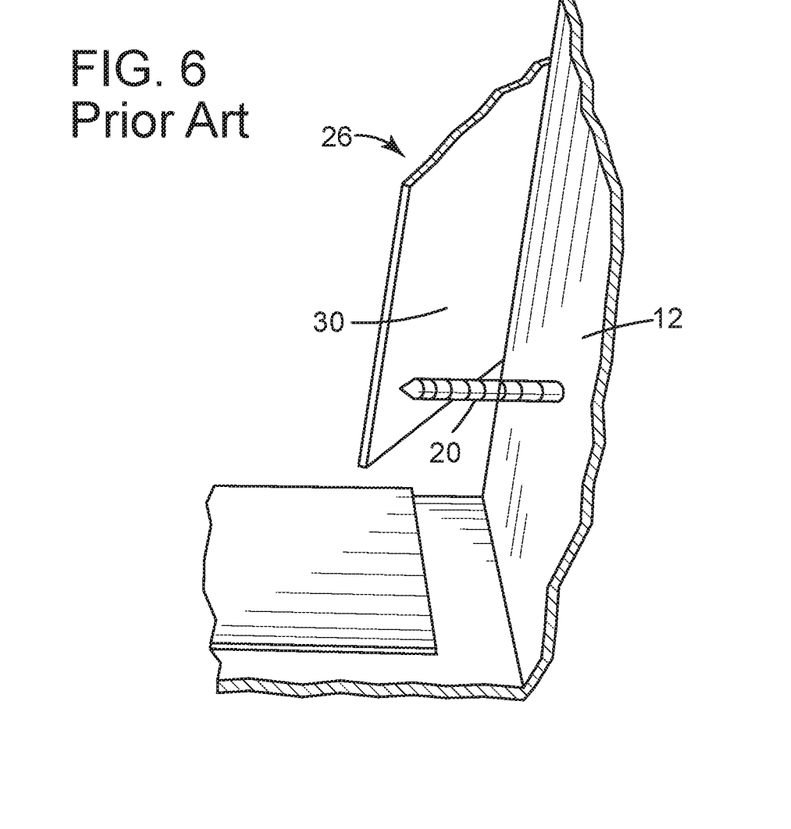
FIG. 6 is a bottom rear perspective view of the improperly assembled flange and end portion of FIG. 5.

Moreover, it is not uncommon that the insertion pressure applied to the fastener 20 typically causes one wall member of the flange and/or the portion of the duct member to bend away from the direction of insertion, and so causing push-out of the components from their original shape, as shown in FIGS. 5-6. The improperly pushed-out, or alternatively pushed-in, and bent flange 26 has an outer wall member 28 and a push-out wall member 30 joined at a bend 32, with the distorted shape of the flange 26 caused by the force of the fastener 20 conveying the insertion pressure from the tool 22, in the direction of the arrow as shown in FIG. 2, to the wall member 30.

Figure 1:
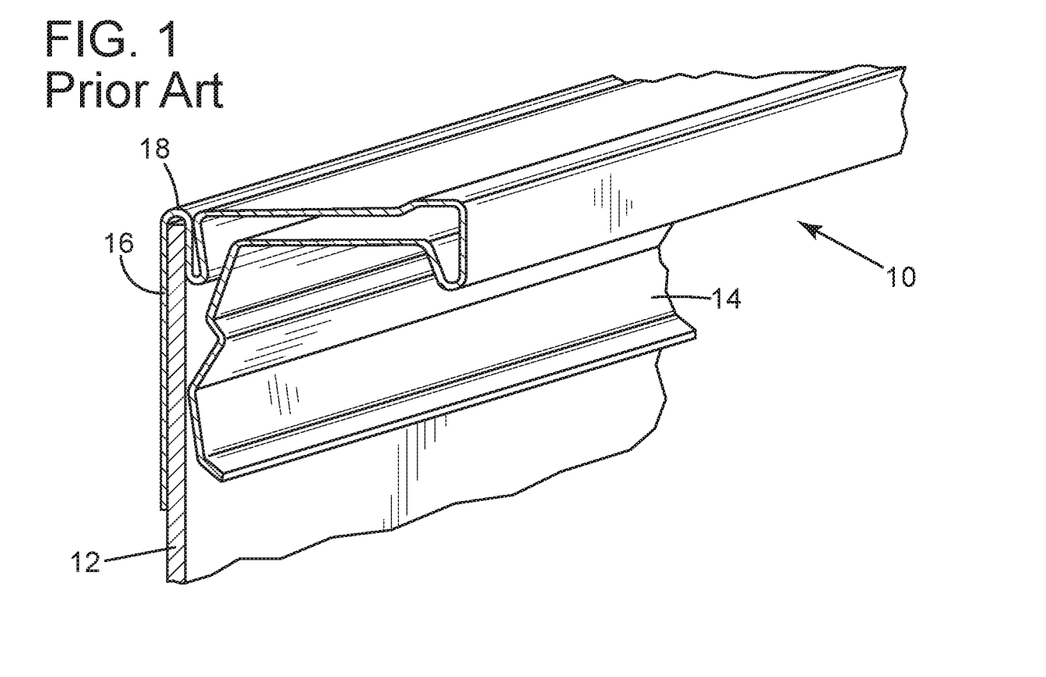
FIG. 1 is a top front left side perspective view of a flange and end portion of a duct member in the prior art.

Once such push-out or bending occurs and forms the bent flange 26 shown in FIGS. 5-6, the fastener 20 must be removed for re-insertion into the flange 26, and the bent wall members 28, 30 of the flange 26 must be restored to their original shape as shown in FIGS. 1-2, or otherwise wastefully discarded and replaced with a new flange 10 and/or a new fastener 20, in order to provide a properly assembled and secure connection as shown in FIGS. 3-4. Otherwise, the joined flange and duct end assembly shown in FIGS. 5-6 will not be sufficiently secured, and may even be unsecured and thus useless for properly interconnecting ducts ends and components.

SUMMARY OF THE INVENTION

In one embodiment, the disadvantages and deficiencies of the prior art are overcome by a flange for an end portion of a duct member having a thickness, comprising: an inner wall member; an outer wall member, which wall members are configured to receive the duct member end portion therebetween; an intermediate member that connects the inner and outer wall members, which intermediate member includes an inner flange panel connected to an outer flange panel; and a plurality of pre-fabricated fastener entry areas disposed in the inner wall member, and a plurality of first fastener indicators disposed on the outer wall member, wherein the pre-fabricated fastener entry areas are substantially aligned with the first fastener indicators, each of the plurality of first fastener indicators being sized to guide and each corresponding fastener entry areas being sized to receive a screw fastener there through to fasten the wall members to the end portion of the duct member.

The flange can include a rib formed in the inner flange panel disposed proximate the inner wall member, which rib is separated from the inner wall member by a distance substantially equal to the thickness of the duct member end portion. In one aspect, the plurality of pre-fabricated fastener entry areas are a plurality of pre-fabricated apertures. Alternatively, the plurality of pre-fabricated fastener entry areas are a plurality of pre-fabricated indentations.

In another aspect, each of the pre-fabricated fastener entry areas and the corresponding first fastener indicators are spaced apart at predetermined regular intervals along a length of each of the wall members. In one aspect, each of the pre-fabricated fastener entry areas is sized as a clearance aperture to receive the fastener.

In one aspect, the first fastener indicators are spaced apart from one another by uniform distances on the outer wall member. Illustratively, each of the plurality of pre-fabricated fastener entry areas and the corresponding first fastener indicators can be spaced apart at predetermined metric distances. Alternatively, each of the pre-fabricated fastener entry areas and the corresponding first fastener indicators are spaced apart at predetermined English unit distances.

In still another aspect, each of the first fastener indicators is formed as one of a dot and a circle. Alternatively, each of the plurality of first fastener indicators is an alphanumeric character. In one aspect, the plurality of first fastener indicators includes repetitive sequences of alphanumeric characters.

In yet another aspect, the flange further comprises a plurality of second fastener indicators provided on the outer wall member, wherein each one of the second fastener indicators corresponds to one of the pre-fabricated fastener entry areas. In one aspect, each of the second fastener indicators is spaced apart from one another by uniform distances on the outer wall member. In another aspect, each second fastener indicator is a repeating sequence of alphanumeric characters. In still another aspect, the plurality of second fastener indicators includes repeating sequences of integers ranging from one through twelve. In yet another aspect, each of the plurality of second fastener indicators is a marking integrated with one of the first plurality of first fastener indicators. In another aspect, each of the second fastener indicators is a marking disposed proximate one of the plurality of first fastener indicators. In a further aspect, each second fastener indicator is positioned above a corresponding first fastener indicator.

In another embodiment, a method is provided for fastening a flange to an end portion of a duct member, which duct member end portion has a thickness, the method comprising the steps of: providing a flange that includes an inner wall member, an outer wall member, which wall members are configured to receive the duct member end portion therebetween, an intermediate member that connects the inner and outer wall members, which intermediate member includes an inner flange panel connected to an outer flange panel, and a rib formed in the inner flange panel disposed proximate the inner wall member, which rib is separated from the inner wall member by a distance substantially equal to the thickness of the duct member end portion, a plurality of pre-fabricated fastener entry areas disposed in the inner wall member, and a plurality of first fastener indicators disposed in the outer wall member, wherein the pre-fabricated fastener entry areas are substantially aligned with the plurality of first fastener indicators, and each of the plurality of first fastener indicators is sized to guide and each corresponding fastener entry areas is sized to receive a self-tapping screw fastener there through to fasten the wall members to the end portion of the duct member; positioning the inner and outer wall members of the flange adjacent to the end portion of the duct member; and passing self-tapping screw fasteners through the first fastener indicators, tapping the fasteners through the duct member end portion, and passing the fasteners through the pre-fabricated fastener entry areas thereby securing the flange to the end portion.

The step of providing a flange can include providing a flange in which the plurality of pre-fabricated fastener entry areas are spaced apart from one another by uniform distances within the inner wall member, and the plurality of first fastener indicators are spaced apart from one another by the uniform distances on the outer wall member. In one aspect, the uniform distances are metric increments. Alternatively, the uniform distances can be predetermined English unit increments.

BRIEF DESCRIPTION OF THE DRAWINGS

Further advantages and features of the present invention will become apparent from the detailed description of a preferred embodiment of the invention with reference to the accompanying drawings, in which.

To facilitate an understanding of the invention, identical reference numerals have been used, when appropriate, to designate the same or similar elements that are common to the figures. Further, unless stated otherwise, the features shown in the figures are not drawn to scale, but are shown for illustrative purposes only.

DETAILED DESCRIPTION OF THE INVENTION

FIGS. 7-17 describe a flange 34 and portions thereof according to the present invention which is provided for assembly on an end portion 12 of a duct member 56.

Figure 7:
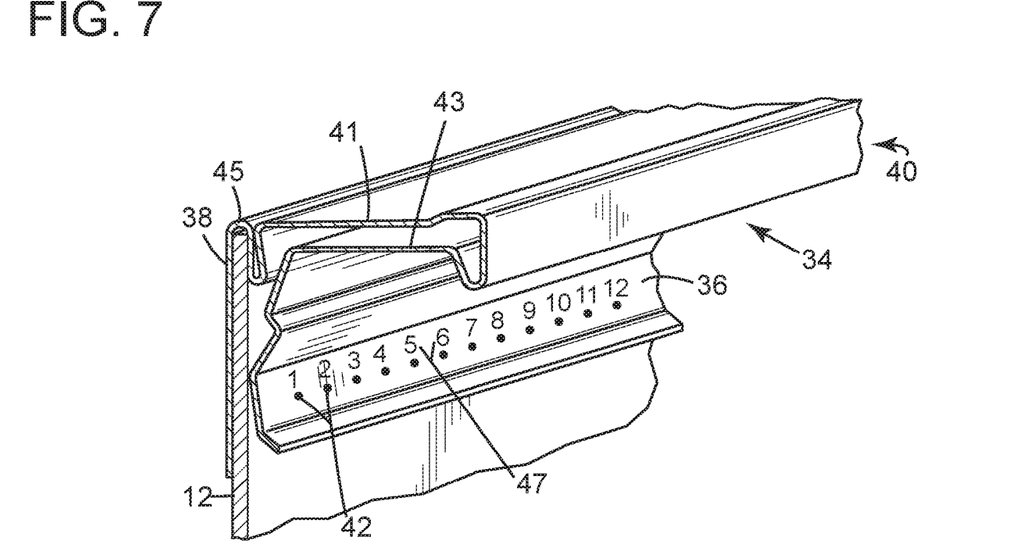
FIG. 7 is a top, front left-side perspective view of a flange according to the present invention and end portion of a duct member.
Figure 16:
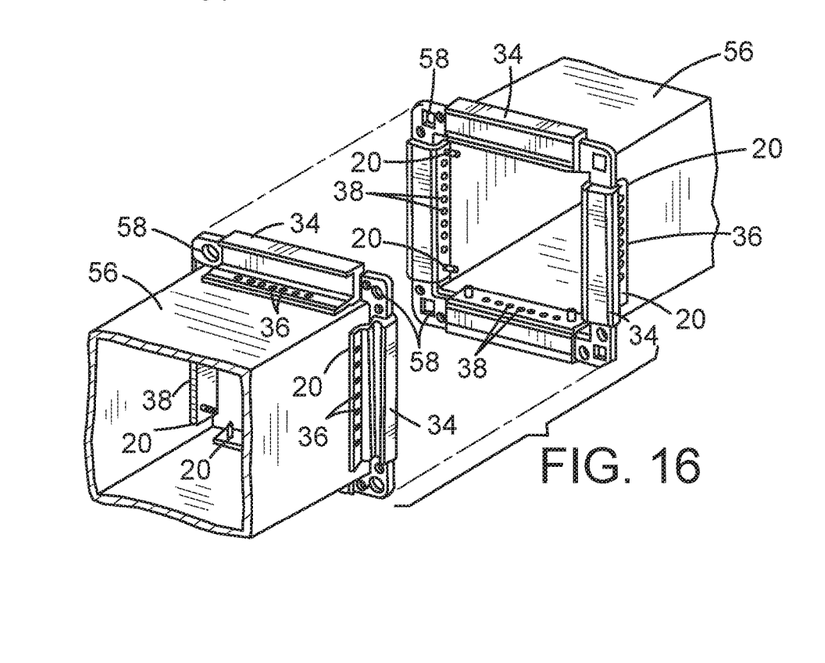
FIG. 16 is a top front perspective view of a pair of duct ends having the flange of the present invention mounted thereon for joining the duct ends together.

As shown in FIG. 7, an example embodiment of the present invention illustrates a flange 34 including at least a front wall member 36 (also referred to herein as an outer wall member 36) configured in a manner known in the art for joining adjacent flanges 34 together. For example, lateral ends of the front wall member 36 of the flange 34 may include corner sections 58 and/or apertures known in the art, such as shown in FIG. 16 and described in greater detail in U.S. Pat. Nos. 4,288,115; 4,564,227; 4,725,083; 5,103,872; and 5,621,956, which are incorporated herein by reference. Such corner sections 58 and/or apertures permit the flanges 34 secured to duct members 56 (see FIG. 16) to be assembled to join such duct members together in a manner known in the art. It is to be understood that the flange 34 may be of any size, shape, or configuration, such as flanges known in the art.

Figure 13:
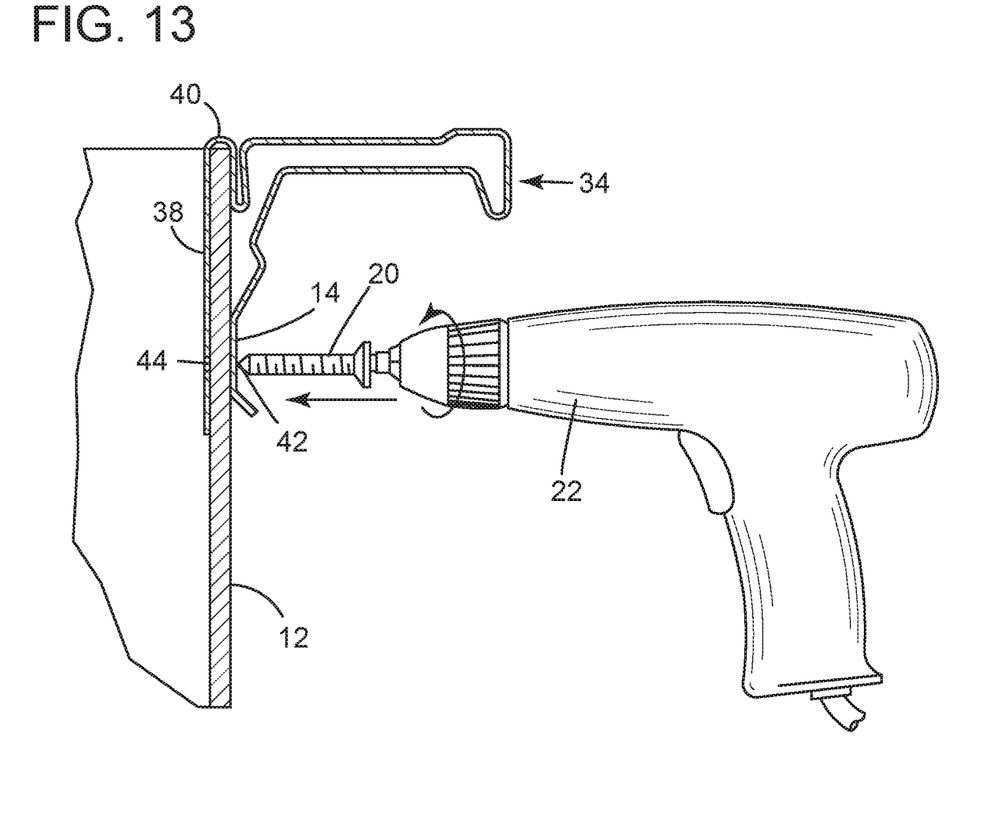
FIG. 13 is a left side cross-sectional view of the flange of FIG. 7 adjacent to an end portion of a duct member, prior to assembly.

In the example embodiment of the present invention shown in FIG. 7, the flange 34 also includes a rear wall member 38 (also referred to herein as an inner wall member 38), with the wall members 36, 36 joined by an intermediate member 40. The wall members 36, 38 of the flange 34 are configured, as shown in FIG. 13, to receive an end portion 12 of a duct member 56 between the wall members 36, 38, and with the front wall member 36 abutting the exterior surfaces of the end portion 12, such that the front wall member 36 is externally exposed. As can be seen from FIG. 7, the intermediate member 40 includes an inner flange panel 41 and an outer flange panel 43. The inner flange panel 41 and outer flange panel 43 are connected to one another. A rib 45 is formed in the inner flange panel 41. The rib 45 is disposed proximate the rear wall member 38, and is separated from the rear wall member 38 by a distance substantially equal to the thickness of the duct member (e.g., see FIGS. 13 and 14). The proximity of the rib 45 to the rear wall member 36 prevents deflection of the flange 34 and thus enables a secure fastening of the flange 34 to the end portion 12 of the duct member 56. The inner flange panel 41 and outer flange panel 43 are configured such that the flange 34 is shaped for receiving corner pieces 58 (e.g., see FIG. 16). The flange 34 may be fabricated from metal, such as aluminum, stainless steel, or other known metals or alloys, by methods known in the art, such as by stamping.

As shown in FIG. 7, the flange 34 includes a plurality of first fastener indicators 42 on the front wall member 36. The first fastener indicators 42 are aligned with a corresponding plurality of fastener entry areas 44 provided through the rear wall member 38, as illustrated in the cut-away portion of the front wall member 36 in FIG. 8. The first fastener indicators 42 and the fastener entry areas 44 are complementary, that is, each first fastener indicator 42 on the front wall member 36 is substantially aligned with a respective fastener entry area 44 on the rear wall member 38.

Figure 8:
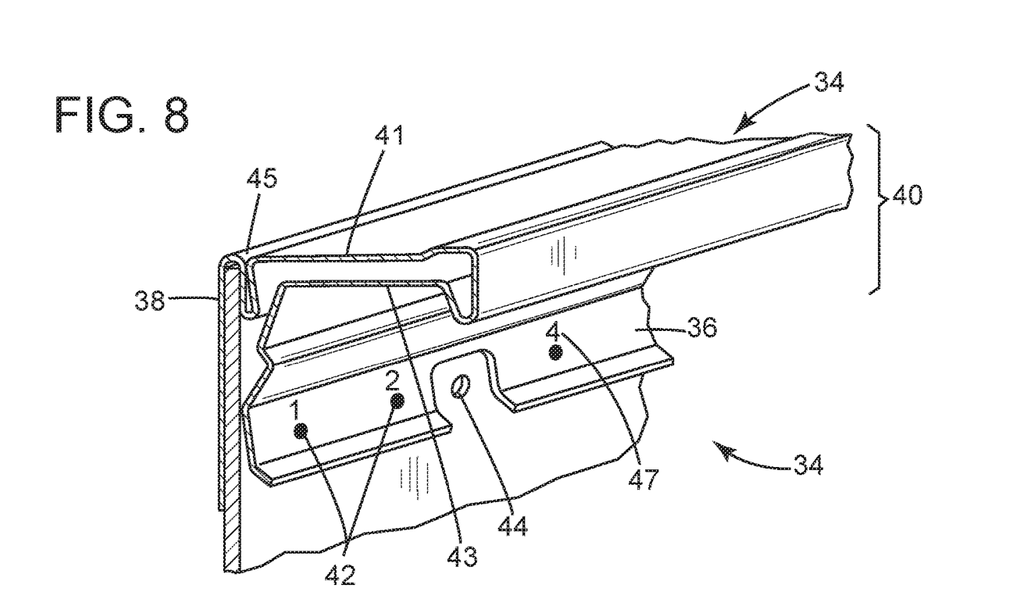
FIG. 8 is a top rear left side perspective view of the flange of FIG. 7.

Accordingly, referring to FIG. 8, when an end portion 12 of a duct member 56 is positioned in the gap between the wall members 36, 38, a pair of complementary first fastener indicators 42 and fastener entry areas 44 is positioned at substantially identical locations on opposite sides of the end portion 12.

Figure 9:
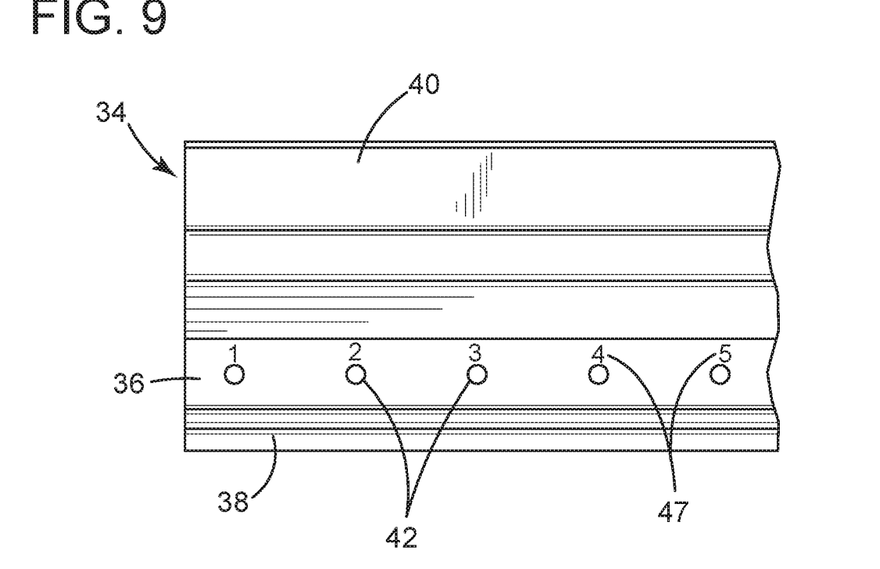
FIG. 9 is a front devotional view of the flange of FIG. 7 along lines 8-8 of FIG. 8 illustrating a plurality of first fastener indicators provided thereon.
Figure 10:
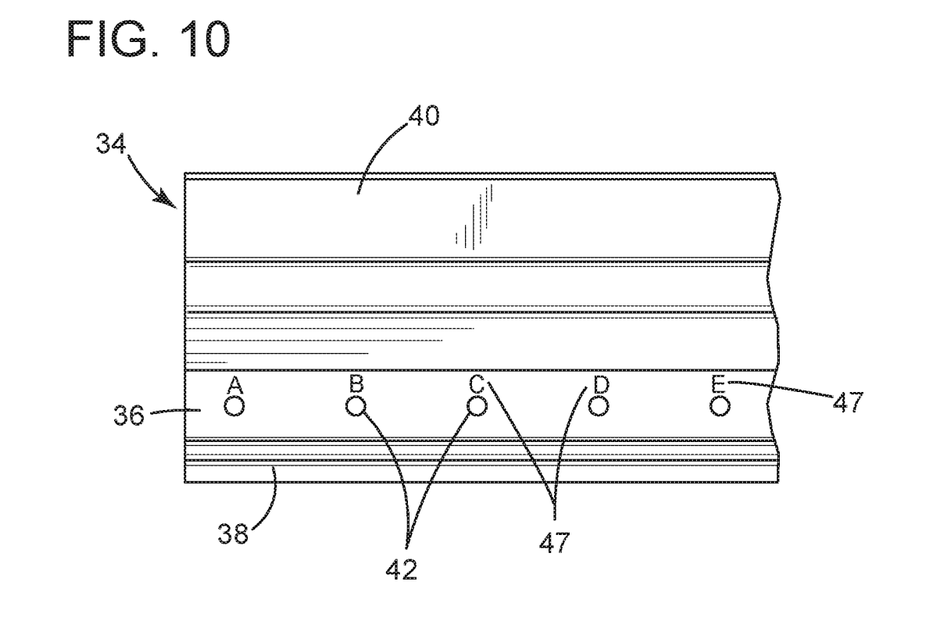
FIG. 10 is a front elevational view of the flange of FIG. 7 along lines 8-8 of FIG. 8 illustrating another plurality of first fastener indicators provided thereon.
Figure 11:
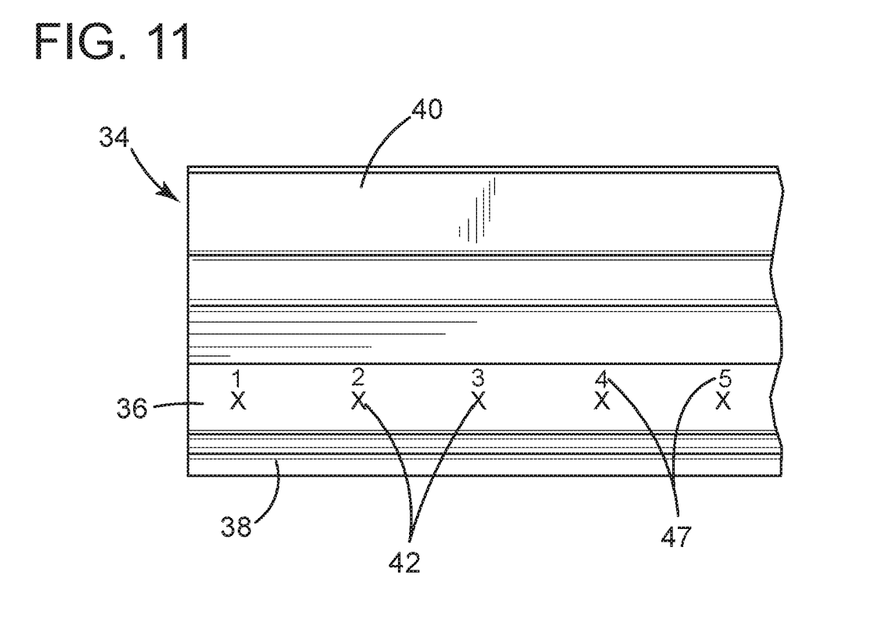
FIG. 11 is a front elevational view of the flange of FIG. 7 along lines 8-8 of FIG. 8 illustrating yet another plurality of first fastener indicators provided thereon.

As shown in FIGS. 8-9, a plurality of first fastener indicators 42 and fastener entry areas 44 are provided along the length of the flange 34 on each of the wall members 36, 38, respectively. In an example embodiment shown in FIG. 8, the plurality of first fastener indicators 42 are regularly spaced apart at predetermined equal distances along the length of the front wall member 36 of the flange 34. Similarly, the plurality of fastener entry areas 44 are regularly spaced apart at predetermined equal distances along the length of the rear wall member 38 of the flange 34.

The first fastener indicators 42 and fastener entry areas 44 may be spaced apart at predetermined metric distances such as, for example, along one-centimeter intervals, or by predetermined English units, such as along one-inch intervals. The predetermined spacing permits an assembler to readily site one or more first fastener indicators 42 and its correspondingly aligned fastener entry areas 44 at any selected distance, for example, from the corner of a duct, in order to meet predetermined specifications (and any applicable building codes) for assembly of the ducts. For example, an assembly specification may require a fastener 20 to be spaced at about two inches from a corner of a duct, so the flange 34 may be positioned along the end portion 12 to site a pair of first fastener indicator 42 and fastener entry area 44 at two inches from the corner.

It is to be understood that the first fastener indicators 42 on the outer wall member 36 may be formed, e.g., stamped, etched, labeled or otherwise scribed in any shape suitable for lining up the tip of the fastener (e.g., self-tapping screw). For example, as shown in FIGS. 7 and 8, the first fastener indicators 42 are formed as dots, while referring to FIGS. 9-12, the first fastener indicators 42 are illustratively shown as a circle and an "X", respectively. Alternatively, the first fastener indicators 42 can be sequences of alphanumeric characters, such as repeating sequences of numbers or letters as illustratively shown in FIG. 17. The shape of the first fastener indicators 42 are not considered limiting and are preferably centrally aligned with the fastener entry areas 44 of the inner wall member 38.

Where the first fastener indicators 42 are non-alphanumeric characters (e.g., dots, circles, and the like), the outer wall member 36 can further include a plurality of second fastener indicators 47 which identify each of the first fastener indicators 42 and their corresponding entry areas 44 (e.g., apertures or indentations). For example, in FIGS. 7-12, alphanumeric characters can serve as the second fastener indicators 47. Preferably, the second fastener indicators 47 are repeating sequences of numbers, e.g., integers 1 through 12 formed along the length of each flange 34 and spaced one inch apart. Illustratively, for a flange 34 having a twenty foot length, there are twenty sequences of repeating integers 1 through 12 on each flange length. The second fastener indicators 47 can be used by a duct assembler for placement of the fastener, e.g., self-tapping screws, as discussed below in further detail with respect to FIG. 17.

Figure 12:
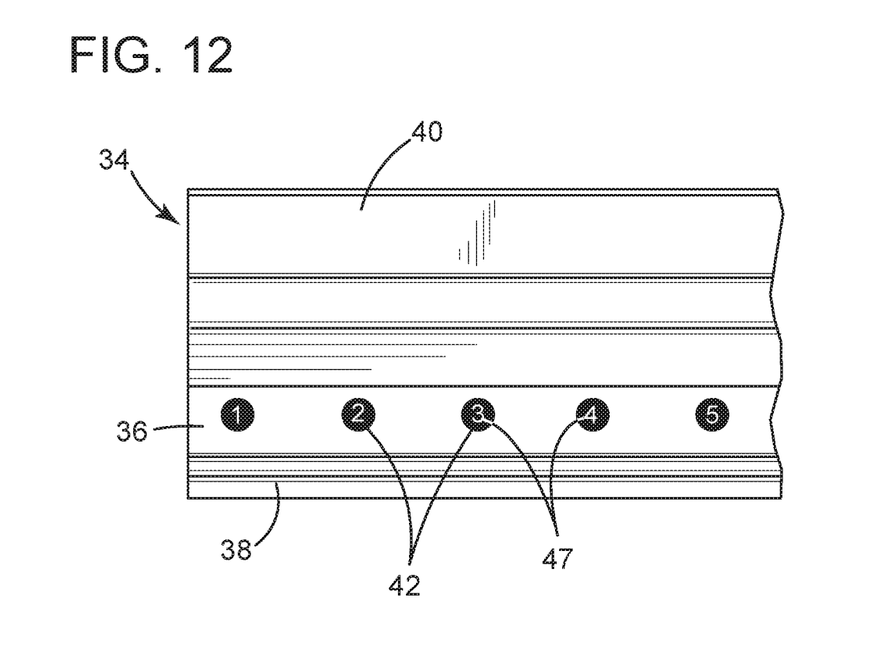
FIG. 12 is a front elevational view of the flange of FIG. 7 along lines 8-8 of illustrating still another plurality of first fastener indicators provided thereon.

In one preferred embodiment, the first and second fastener indicators 42, 47 can be overlaid or integrated together, as illustratively shown in FIG. 12. A person of ordinary skill in the art will appreciate that other first and second fastener indicators 42, 47 can be provided to indicate where to position the tip of the self-tapping screw and differentiating one first fastener indicator from another.

It is also to be understood that the fastener entry areas 44 on the inner/rear wall member 38 may be through-holes or indentations of any shape, and not limited to circular holes or indentations. For example, in alternative embodiments the fastener entry areas 44 may be slots forming an elongated hole having, for example, rounded ends, or may be a square hole or a rectangular hole or slot. Such holes may instead be replaced by indentations of similar shape. In the form of circular-ended slots or rectangular slots, the fastener entry areas 44 facilitate entry of the fastener 20 therethrough even though the complementary first fastener indicator 42 on opposite sides of the end portion 12 may not be perfectly aligned.

Referring to FIG. 13, during the mounting operation of the flange 34 to the end section 12, the flange 34 is positioned about the end portion 12, and with the first fastener indicator 42 and fastener entry areas 44 on either side of the end portion 12, with the fastener 20 oriented for insertion by the tool 22, and with the first fastener indicators 42 and the fastener entry areas 44 being of any size and shape and any configuration, such as any of the first fastener indicators 42 of FIGS. 7-12, or the holes 44 in the rear wall member 38 being of any size/shape or an indentation of any size or shape as discussed above.

Figure 14:
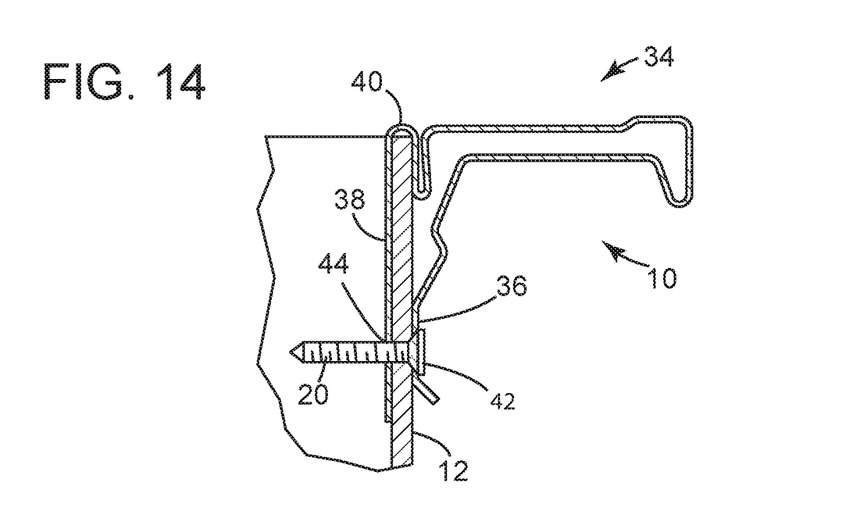
FIG. 14 is a left side cross-sectional view of the assembled end portion and flange of FIG. 7.

In the example shown in FIGS. 13 and 14, the first fastener indicators 42 are small circular dots and the fastener entry areas 44 are through-holes formed in rear wall member 38. Alternatively, it is to be understood that the fastener entry areas 44 may be spaced-apart indentations 48.

Figure 15:
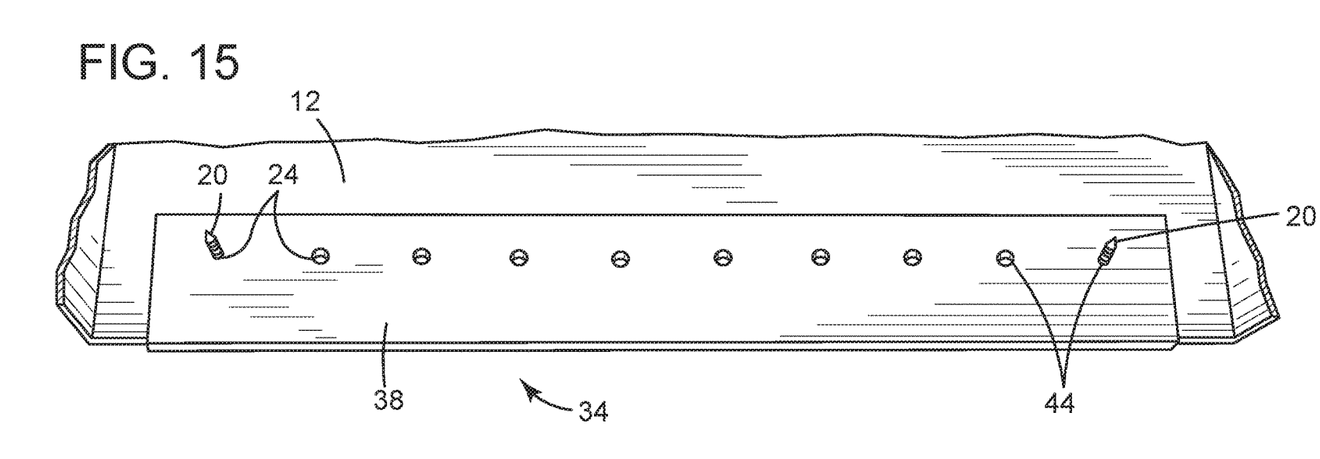
FIG. 15 is rear perspective view of the assembled flange and end portion of FIG. 7.

With the fastener 20 positioned over one of the first fastener indicators 42 as shown in FIG. 13, the tool 22 more easily inserts the fastener 20 through the outer/front wall member 36 at the first indicator 42, through the section of the end portion 12 between the first fastener indicator 42 and the corresponding fastener entry area 44, and then through the fastener entry area 44 without undesirably bending the rear/inner wall member 38 to form the assembled flange and end section shown in FIGS. 15-16.

Figure 17:
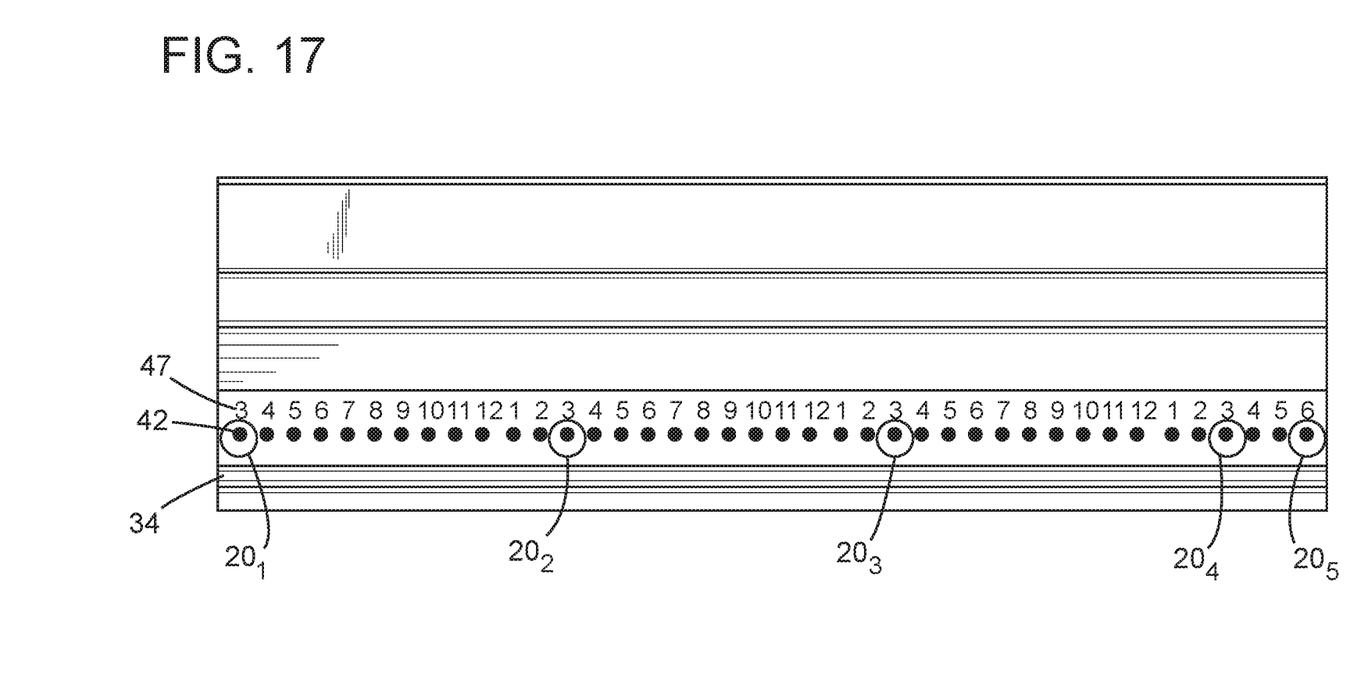
FIG. 17 is a front elevational view of the flange of FIG. 7 illustrating placement of fasteners using the fastener indicators provided thereon.

By providing one or more fastener indicators 42, 47 and corresponding fastener entry areas 44, assembly of the final configuration shown in FIGS. 15-17 is performed more quickly, more effectively, and with less force and torque required by the tool 22. In addition, since the rear wall member 38 has a complementary fastener entry area 44 ready to receive the fastener 20 passing through the adjacent region of the end portion 12, there is little or no chance for the fastener 20 to apply force to the rear wall member 38 and therefore, the rear wall member 38 will not be pushed-out in an improper configuration as shown in FIGS. 5-6.

Accordingly, the final configuration of the flange 34 and the end portion 12 of the duct member 56 may be assembled more rapidly and efficiently in the field with fewer or no mistakes requiring remedy. In effect, the effort to create the first and second fastener indicators 42, 47 and the fastener entry areas 44 is performed during fabrication of the flange 34, long before use and assembly in the field, so assemblers may complete their work more efficiently. As shown in FIG. 16, the combination of the flange 34 mounted to the end portion 12 of a duct member 56 can have corner pieces 58 mounted in adjoining flanges 34 on the corners of the ends of the duct member 56, in a manner similar to the use of corner pieces in the prior art. Pairs of duct members 56 having such mounted flanges 34 can then be assembled together, for example, by fastening complementary corner pieces 58 together.

In addition, since the first fastener indicators 42 and their corresponding fastener entry areas 44 are regularly spaced along the length of the flange 34, the duct assembler in the field can readily locate multiple areas 42 for inserting a predetermined number of fasteners 20 at any prescribed or required distance, for example, relative to a corner section of the duct member 56.

Referring to FIG. 17, the second fastener indicators 47 are provided to assist the duct assembler with quickly positioning and installing the self-tapping screws at predetermined and substantially evenly-spaced intervals along a length of the flange 34. For example, the flange typically is manufactured in lengths of twenty feet with the first fastener indicators 42 and corresponding fastener entry areas 44 spaced one inch apart from each other along the respective front and rear wall members 36, 38. A person of ordinary skill in the art will appreciate that not every pairing of first fastener indicators 42 and fastener entry areas 44 requires a fastener 20. Rather, a fastener 20 is typically installed (i) at each pairing 42, 44 that is located within an inch of a corner or end of the flange 34, and (ii) at predetermined intervals, e.g., approximately every twelve inches for flange lengths approximately or greater than twenty-four inches (two feet).

In the example of FIG. 17, a flange 34 having a required length of approximately 40 inches is illustratively shown for purposes of better understanding the spacing and placement of the fasteners 20. The length of flange 34 of FIG. 4 was previously cut from a twenty foot flange length and its lowest second fastener indicator 47 illustratively begins at the number three. The repeating sequence of the second fastener indicators 47 is numbered one through twelve on the flange 34. The two end pairs 42, 44 of the flange length each receive a fastener (e.g., fasteners $20_1$ and $20_5$). The duct assembler can quickly identify the twelve inch spacing from the first pair 42, 44 by looking at its number, i.e., the first instance of "3" and finding the recurring next instances of the number "3" in which the fastener(s) are inserted with the tool. As shown in FIG. 17, three fasteners $20_2$ through $20_4$ are inserted in the flange 34 twelve inches apart. A person of ordinary skill in the art will appreciate that in the example of FIG. 17, a duct assembler could have started from the right side of the flange 34 and placed a faster 20 at the two end holes $20_1$ and $20_5$ as above, but the three fasteners between the ends could have been inserted at each second fastener indicator 42 with a number "6". Accordingly, a duct assembler does not need to use a tape measure when installing the flanges 34, since they are repeatedly pre-stamped or otherwise marked at twelve inch intervals. A person skilled in the art will also appreciate that the twelve inch marking system is not considered limiting. For example, the second fastener indicators 47 could have a repeating sequence of one through eight so that the duct assembler will insert a fastener 20 through each pair of first fastener indicators 42 and fastener entry areas 44 every eight inches apart.

The material strength of the flange 34 is also maintained, since the front/outer wall member 36 is not weakened by the stamped fastener indicators 42, 47, and fastener entry areas 44 formed in the rear/inner wall member 38 are relatively small in size compared to the overall dimensions of the flange 34. In addition, insertion of the fastener 20 through the flange 34 of the present invention will have minimal debris from the insertion point positioned between the flange 34 and the end portion 12, and so the assembled flange 34 and end portion 12 of FIGS. 15-16 will have a tighter fit compared to the assembly of the prior art shown in FIGS. 3-4.

While the preferred embodiment of the present invention has been shown and described herein, it will be obvious that such embodiment is provided by way of example only. Numerous variations, changes and substitutions will occur to those skilled in the art without departing from the invention herein. Accordingly, it is intended that the invention be limited only by the spirit and scope of the appended claims.

What is claimed is:

1. A flange for an end portion of a duct member having a thickness, comprising:
   an inner wall member;
   an outer wall member, which wall members are configured to receive the duct member end portion therebetween;
   an intermediate member that connects the inner and outer wall members, which intermediate member includes an inner flange panel connected to an outer flange panel; and
   a plurality of pre-fabricated fastener entry areas disposed in the inner wall member, and a plurality of first fastener indicators disposed on the outer wall member, wherein the pre-fabricated fastener entry/areas are substantially aligned with the first fastener indicators, each of the plurality of first fastener indicators being sized to guide and each corresponding fastener entry areas being sized to receive a screw fastener there through to fasten the wall members to the end portion of the duct member, and
   wherein each of the plurality of first fastener indicators is an alphanumeric character.

2. The flange of claim 1 further comprising a rib formed in the inner flange panel disposed proximate to and spaced apart from the inner wall member.

3. The flange of claim 1, wherein the plurality of pre-fabricated fastener entry areas are a plurality of pre-fabricated apertures.

4. The flange of claim 1, wherein the plurality of pre-fabricated fastener entry areas are a plurality of pre-fabricated indentations.

5. The flange of claim 1, wherein each of the pre-fabricated fastener entry areas and the corresponding first fastener indicators are spaced apart at regular intervals along a length of each of the wall members.

6. The flange of claim 1, wherein the each of the plurality of pre-fabricated fastener entry areas and the corresponding first fastener indicators are spaced apart at metric distances.

7. The flange of claim 1, wherein each of the pre-fabricated fastener entry areas and the corresponding first fastener indicators are spaced apart at English unit distances.

8. The flange of claim 1, wherein each of the pre-fabricated fastener entry areas is sized as a clearance aperture to receive the fastener.

9. The flange of claim 1, wherein the first fastener indicators are spaced apart from one another by uniform distances on the outer wall member.

10. The flange of claim 1, wherein the plurality of first fastener indicators includes repetitive sequences of alphanumeric characters.

11. The flange of claim 1 further comprising a plurality of second fastener indicators provided on the outer wall member, wherein each one of the second fastener indicators corresponds to one of the pre-fabricated fastener entry areas.

12. The flange of claim 11, wherein each of the second fastener indicators are spaced apart from one another by uniform distances on the outer wall member.

13. The flange of claim 11, wherein each second fastener indicator is a repeating sequence of alphanumeric characters.

14. The flange of claim 11, wherein the plurality of second fastener indicators includes repeating sequences of integers ranging from one through twelve.

15. The flange of claim 11, wherein each of the plurality of second fastener indicators is a marking integrated with one of the first plurality of first fastener indicators.

16. The flange of claim 11, wherein each of the second fastener indicators is a marking disposed proximate one of the plurality of first fastener indicators.

17. The flange of claim 11, wherein each second fastener indicator is positioned above a corresponding first fastener indicator.

18. A method for fastening a flange to an end portion of a duct member, which duct member end portion has a thickness, the method comprising the steps of:
   providing a flange that includes an inner wall member, an outer wall member, which wall members are configured to receive the duct member end portion therebetween, an intermediate member that connects the inner and outer wall members, which intermediate member includes an inner flange panel connected to an outer flange panel, and a rib formed in the inner flange panel disposed proximate to and spaced apart from the inner wall member, a plurality of pre-fabricated fastener entry areas disposed in the inner wall member, and a plurality of first fastener indicators disposed in the outer wall member, wherein the pre-fabricated fastener entry areas are substantially aligned with the plurality of first fastener indicators, and each of the plurality of first fastener indicators is sized to guide and each corresponding fastener entry areas is sized to receive a self-tapping screw fastener there through to fasten the wall members to the end portion of the duct member, and
   wherein each of the plurality of first fastener indicators is an alphanumeric character;
   positioning the inner and outer wall members of the flange adjacent to the end portion of the duct member; and
   passing self-tapping screw fasteners through the first fastener indicators, tapping the fasteners through the duct member end portion, and passing the fasteners through the pre-fabricated fastener entry areas thereby securing the flange to the end portion.

19. The method of claim 18, wherein the step of providing a flange includes providing a flange in which the plurality of pre-fabricated fastener entry areas are spaced apart from one another by uniform distances within the inner wall member, and the plurality of first fastener indicators are spaced apart from one another by the uniform distances on the outer wall member.

20. The method of claim 18, wherein the uniform distances are metric increments.

21. The method of claim 18, wherein the uniform distances are English unit increments.

\* \* \* \* \*